(12) United States Patent
Degrendel et al.

(10) Patent No.: US 7,881,465 B2
(45) Date of Patent: Feb. 1, 2011

(54) CIRCUIT AND METHOD FOR CALCULATING A LOGIC COMBINATION OF TWO ENCRYPTED INPUT OPERANDS

(75) Inventors: Antoine Degrendel, Munich (DE); Winfried Kamp, Munich (DE); Manfred Roth, Munich (DE)

(73) Assignee: Infineon Technologies AG (DE)

( * ) Notice: Subject to any disclaimer, the term of this patent is extended or adjusted under 35 U.S.C. 154(b) by 1218 days.

(21) Appl. No.: 11/461,935

(22) Filed: Aug. 2, 2006

(65) Prior Publication Data

US 2007/0030031 A1    Feb. 8, 2007

Related U.S. Application Data

(60) Provisional application No. 60/756,878, filed on Jan. 5, 2006.

(30) Foreign Application Priority Data

Aug. 8, 2005    (DE) .................. 10 2005 037 356

(51) Int. Cl.
*H04L 9/28* (2006.01)

(52) U.S. Cl. .......................... 380/28; 326/95

(58) Field of Classification Search ............ 380/28–30, 380/44, 47; 326/98, 83, 112, 17, 95, 52–55; 708/710

See application file for complete search history.

(56) References Cited

U.S. PATENT DOCUMENTS

| | | | | |
|---|---|---|---|---|
| 6,069,497 A | * | 5/2000 | Blomgren et al. | 326/105 |
| 6,107,835 A | * | 8/2000 | Blomgren et al. | 326/98 |
| 6,236,240 B1 | * | 5/2001 | Hill | 326/98 |
| 6,329,846 B1 | * | 12/2001 | Davies et al. | 326/121 |
| 6,765,410 B2 | * | 7/2004 | Meneghini | 326/52 |

(Continued)

FOREIGN PATENT DOCUMENTS

DE    103 44 647 B3    2/2005

OTHER PUBLICATIONS

Stefan Mangard, et al., "Side-Channel Leakage of Masked CMOS Gates," Institute for Applied Information Processing and Communications, Graz, Austria, 2005.

(Continued)

*Primary Examiner*—Nirav Patel
(74) *Attorney, Agent, or Firm*—Dickstein Shapiro LLP

(57) ABSTRACT

Circuit for calculating a logic combination of two encrypted input operands recieves first and second dual-rail signals comprising data values in a calculation cycle and precharge values in a precharge cycle, and receives a dual-rail encryption signal comprising encryption values in the calculation cycle and precharge values in the precharge cycle, and outputs a dual-rail result signal comprising encrypted result values in the calculation cycle and precharge values in the precharge cycle. The data and encrypted result values are encrypted with the encryption values of the dual-rail encryption signal according to an encryption rule. A logic circuit determines the encrypted result values according to the logic combination from the data and encryption values, and outputs the encrypted result values in the calculation cycle. A precharge circuit impresses precharge values when precharge values are sensed at a single input, or stops impressing the precharge values only when the first and second dual-rail signals comprise data values and the dual-rail encryption signal comprises encryption values.

15 Claims, 14 Drawing Sheets

U.S. PATENT DOCUMENTS

| | | | |
|---|---|---|---|
| 7,071,725 B2 * | 7/2006 | Fujisaki | 326/8 |
| 7,358,769 B2 | 4/2008 | Roemer et al. | |
| 7,545,933 B2 | 6/2009 | Kunemund | |
| 7,567,668 B2 | 7/2009 | Gammel et al. | |
| 7,613,763 B2 | 11/2009 | Elbe et al. | |
| 7,693,930 B2 * | 4/2010 | Karaki | 708/704 |
| 2002/0101262 A1 | 8/2002 | Taki | |
| 2002/0169968 A1 * | 11/2002 | Gammel et al. | 713/189 |
| 2003/0218475 A1 * | 11/2003 | Gammel | 326/8 |
| 2007/0030031 A1 | 2/2007 | Degrendel et al. | |

OTHER PUBLICATIONS

Thomas Popp, et al., "Masked Dual-Rail Pre-Charge Logic: DPA-Resistant Circuits without Routing Constraints," Institute for Applied Information Processing and Communications, Graz, Austria, Feb. 11, 2005.

* cited by examiner

FIG 4

| XOR2 FUNCTION | AM | AM_N | BM | BM_N | M | M_N | ZM | ZM_N |
|---|---|---|---|---|---|---|---|---|
| A/B/M=I/-/- | 0 | 0 | - | - | - | - | 0 | 0 |
| A/B/M=-/I/- | - | - | 0 | 0 | - | - | 0 | 0 |
| A/B/M=-/-/I | - | - | - | - | 0 | 0 | 0 | 0 |
| A/B/M=0/0/0 | 0 | 1 | 0 | 1 | 0 | 1 | 0 | 1 |
| A/B/M=0/0/1 | 0 | 1 | 0 | 1 | 1 | 0 | 1 | 0 |
| A/B/M=0/1/0 | 0 | 1 | 1 | 0 | 0 | 1 | 1 | 0 |
| A/B/M=0/1/1 | 0 | 1 | 1 | 0 | 1 | 0 | 0 | 1 |
| A/B/M=1/0/0 | 1 | 0 | 0 | 1 | 0 | 1 | 1 | 0 |
| A/B/M=1/0/1 | 1 | 0 | 0 | 1 | 1 | 0 | 0 | 1 |
| A/B/M=1/1/0 | 1 | 0 | 1 | 0 | 0 | 1 | 0 | 1 |
| A/B/M=1/1/1 | 1 | 0 | 1 | 0 | 1 | 0 | 1 | 0 |

($3^3$=27 STATES OVERALL)

| A | B | Z |
|---|---|---|
| 0 | 0 | 0 |
| 0 | 1 | 1 |
| 1 | 0 | 1 |
| 1 | 1 | 0 |

| AM | BM | M | ZM |
|----|----|---|----|
| 0  | 0  | 0 | 0  |
| 0  | 0  | 1 | 1  |
| 0  | 1  | 0 | 1  |
| 0  | 1  | 1 | 0  |
| 1  | 0  | 0 | 1  |
| 1  | 0  | 1 | 0  |
| 1  | 1  | 0 | 0  |
| 1  | 1  | 1 | 1  |

FIG 15C
PRIOR ART

| XOR2 FUNCTION | AM | AM_N | BM | BM_N | M | M_N | ZM | ZM_N |
|---|---|---|---|---|---|---|---|---|
| A/B/M=I/-/- | 0 | 0 | - | - | - | - | - | - |
| A/B/M=-/I/- | - | - | 0 | 0 | - | - | - | - |
| A/B/M=-/-/I | - | - | - | - | 0 | 0 | - | - |
| A/B/M=0/0/0 | 0 | 1 | 0 | 1 | 0 | 1 | 0 | 1 |
| A/B/M=0/0/1 | 0 | 1 | 0 | 1 | 1 | 0 | 1 | 0 |
| A/B/M=0/1/0 | 0 | 1 | 1 | 0 | 0 | 1 | 1 | 0 |
| A/B/M=0/1/1 | 0 | 1 | 1 | 0 | 1 | 0 | 0 | 1 |
| A/B/M=1/0/0 | 1 | 0 | 0 | 1 | 0 | 1 | 1 | 0 |
| A/B/M=1/0/1 | 1 | 0 | 0 | 1 | 1 | 0 | 0 | 1 |
| A/B/M=1/1/0 | 1 | 0 | 1 | 0 | 0 | 1 | 0 | 1 |
| A/B/M=1/1/1 | 1 | 0 | 1 | 0 | 1 | 0 | 1 | 0 |

($3^3$=27 STATES OVERALL)

CIRCUIT AND METHOD FOR CALCULATING A LOGIC COMBINATION OF TWO ENCRYPTED INPUT OPERANDS

CROSS-REFERENCE TO RELATED APPLICATION

This application claims priority from German Patent Application No. 10 2005 037 356.9, which was filed on Aug. 08, 2005, and from Provisional U.S. Patent Application No. 60/756,878, which was filed on Jan. 05, 2006, and which are both incorporated herein by reference in their entirety.

BACKGROUND OF THE INVENTION

1. Field of the Invention

The present invention relates to a circuit and a method for calculating a logic combination of two input operands, which can be employed for safety-relevant applications, in particular.

2. Description of the Related Art

Circuits employed for the processing of security-relevant data are designed, if possible, so that the data to be processed is protected from attackers attempting to obtain the safety-relevant data by an analysis of the circuit. Due to SPS/DPA (simple power attack/differential power attack) attacks, it is necessary for high-security applications to design the current consumption of an integrated circuit independently of the processed data.

This problem may be solved by a dynamic dual-rail circuit technology the design, characterization, and verification of which is, however, time-consuming. A library based on the dynamic dual-rail circuit technology cannot be synthesized, due to the precharge signals required for a pre-charge state between the data states, and is not suited for static timing analyses.

A static implementation of circuitry for processing two dual-rail signals is described in the patent document DE 103 44 647 B3. The dual-rail signals have precharge signals with precharge values between valid data values. Valid data values are characterized in that respective logic states inverted with respect to each other exist on both individual signals of the dual-rail signal. Precharge values are characterized in that the same logic states exist on both signals of a dual-rail signal. According to the patent document, the precharge values present at the inputs of the circuitry are passed through onto an output of the circuitry.

The patent document mentioned does not deal with encrypted signals.

In the "masking" technology, internal signals are encrypted by a mask. Here, special new logic cells capable of generating an also encrypted output signal ZM from masked input signals AM and BM as well as a mask M are employed.

FIG. 14 shows a block circuit diagram of such a logic cell with the masked inputs AM, BM, an input for the mask M, and an output for outputting the encrypted output signal ZM.

The underlying masking is described on the basis of FIGS. 15a and 15b.

FIG. 15a shows a table of values for an XOR combination. Here, the signals A, B, Z are not encrypted. The table of values for the XOR2 combination is based on the equation A xor B=Z.

FIG. 15b shows a table of values of an XOR combination for masked signals AM, BM, ZM, wherein the mask M is used. The encryption or masking is an XOR combination of the signals AM, BM, ZM with the value of the mask M. Thus, AM=AM XOR M; BM=BM XOR M; ZM=ZM XOR M applies. The shown table of values of the masked XOR2 combination is based on the equation ((AM xor M) xor (BM xor M)) xor M=ZM.

From the document "Side-Channel Leakage of Masked CMOS Gates; Stefan Mangard, Thomas Popp, Berndt M. Gammel", it is known that possible glitches, i.e. spurious impulses, render the logic vulnerable in a single-rail realization of the masked circuit technology.

One possibility for secure encryption of masked signals consists in a masked dual-rail precharge logic. As with unencrypted dual-rail, the signals encrypted with the mask M and also the mask itself are embodied twice. Thus, there are two dual-rail input signals AM, AMN, and BM, BMN, as well as a dual-rail mask M, MN. Furthermore, an idle phase is introduced between two valid value sequences. The idle phase is a precharge state, or also called "precharge", between two evaluate phases, also called calculation cycles in the following. As with unencrypted dual-rail, an alternating sequence of the two states develops:

Evaluate→Idle→Evaluate→Idle→Evaluate→Idle→Evaluate . . .

Here, the following effect is taken advantage of:

At the transition form an idle state to a valid value in the evaluate phase, only rising edges can occur:

(0/0)→(1/0)

(0/0)→(0/1)

According to definition, no physical signal goes back to low from high in this transition phase.

The same applies to the transition of a valid value to an idle state.

(1/0)→(0/0)

(0/1)→(0/0)

A table of values for an XOR combination according to such a masked dual-rail technology is shown in FIG. 15c. According to this table of values, the outputs ZM, ZM_N are at undefined values, as soon as one of the input signals AM, AM_N, BM, BM_N, M, M_N goes to the idle state. If all input signals are in the idle state, the output signal ZM, ZM_N also goes to the idle state.

It has turned out that, due to glitches, which occur in every CMOS circuit, a masked dual-rail circuit nevertheless is vulnerable.

In particular, at a transition from a calculation cycle, i.e. a cycle with valid data values at the inputs, to a precharge cycle, i.e. a cycle in which precharge values are present at the input, or at a reverse transition, spurious impulses may occur.

In particular, this is the case when, at the transition from the calculation cycle to the precharge cycle, the precharge value is already present on an input signal, but a valid data value is still present on the other input signal. In this case, a precharge value may already be output at the output, or also still a data value. It is also not impossible that several different data values are output at the output at a transition in the meantime, before finally outputting precharge values at the output. The same problem occurs in the transition from precharge cycle to the calculation cycle. When a valid data value is already present at one of the inputs, but still a precharge value at the other input, it is again open whether already a valid data value, changing data values, or still a precharge value is present at the output. These insecurities may lead to spurious impulses and represent a point of attack for most recent attack scenarios in which it is attempted to recognize different switching time instants and then assess the current course correspondingly by a higher temporal resolution of the current consumption of a circuit.

SUMMARY OF THE INVENTION

The present invention to provides a circuit and a method for calculating a logic combination of encrypted input operands, which enable secure processing of the operands.

In accordance with a first aspect, the present invention provides a circuit for calculating a logic combination of two input operands, having: a first input for receiving a first dual-rail signal having data values of the first input in a calculation cycle and precharge values in a precharge cycle; a second input for receiving a second dual-rail signal having data values of the second input in the calculation cycle and precharge values in the precharge cycle; a third input for receiving a dual-rail encryption signal having encryption values in the calculation cycle and precharge values in the precharge cycle; an output for outputting a dual-rail result signal having encrypted result values in the calculation cycle and precharge values in the precharge cycle; wherein the data values of the first and second dual-rail signals and the encrypted result values of the dual-rail result signal are encrypted with the encryption values of the dual-rail encryption signal according to an encryption rule; a logic circuit for determining the encrypted result values according to the logic combination from the data values of the first input and of the second input and the encryption values, and for outputting the encrypted result values at the output in the calculation cycle; and a precharge circuit formed to already impress precharge values in the output when precharge values are sensed at a single input, or formed to start impressing the precharge values only when the first dual-rail signal and the second dual-rail signal have data values and the dual-rail encryption signal has encryption values.

In accordance with a second aspect, the present invention provides a method of calculating a logic combination of two input operands, by: receiving a first dual-rail signal at a first input, which has data values of the first input in a calculation cycle and precharge values in a precharge cycle; receiving a second dual-rail signal at a second input, which has data values of the second input in the calculation cycle and precharge values in the precharge cycle; receiving a dual-rail encryption signal having encryption values in the calculation cycle and precharge values in the precharge cycle; determining encrypted result values according to the logic combination from the data values of the first input and of the second input and the encryption values, and outputting the encrypted result values in the calculation cycle at an output for outputting a dual-rail result signal having the encrypted result values in the calculation cycle and precharge values in the precharge cycle; wherein the data values of the first and second dual-rail signals and the result values of the third dual-rail signal are encrypted with the encryption values of the dual-rail encryption signal according to an encryption rule; impressing precharge values at the output already when precharge values are sensed at a single input, or stopping impressing the precharge values only when the first and second dual-rail signals have data values and the dual-rail encryption signal has encryption values.

The inventive approach expands the tables of values according to the prior art by the case that, as soon as an arbitrary dual-rail input pair comprises precharge values, the gate output also comprises precharge values. Conversely, the expansion also means that the dual-rail output pair only leaves the precharge state, when no input is in the precharge state anymore.

By applying these expansions, the current course to be measured is harmonized substantially between different input changes.

In addition, so-called "don't care" states on the input side of such an inventive table of values lead to simplification of the circuit according to the invention. The "don't care" states are states in which at least one of the input signals has precharge values. In this case, the remaining input signals are no longer cared about, because precharge values are impressed on the output, independently of the other input signals.

The inventive approach allows for gate implementations driven at every time instant. i.e., there is no dynamic state. Thus, a library based on these gate implementations is suitable for the synthesis of a circuit.

The circuit technology proposed prevents a time instant of a change of the output datum from depending on the individual time instants of the change of the input data. Furthermore, hazards, i.e. spurious effects or glitches, i.e. spurious impulses, are avoided during switching processes. Thus, conclusions on the processed data are prevented from succeeding when measuring the current flow.

The present invention is based on the finding that the transition from a calculation cycle, also called evaluate, to a precharge cycle, also called idle, happens as soon as the first input signal goes to the precharge state. Furthermore, a transition from the precharge cycle to the calculation cycle is only allowed to happen when the last input signal has also gone to the calculation state. Even if no further changes resulted functionally, the output signal is not allowed to change early. Thus, the output change is triggered by the last input and the observability is reduced further, because an early change would be data-dependent.

BRIEF DESCRIPTION OF THE DRAWINGS

These and other objects and features of the present invention will become clear from the following description taken in conjunction with the accompanying drawings, in which:

FIG. 4 is a table of values of a logic combination according to an embodiment of the present invention;

FIG. 15c is a table of values with a logic basic function realized by tables of values according to the invention.

DESCRIPTION OF THE PREFERRED EMBODIMENTS

Figure 1:
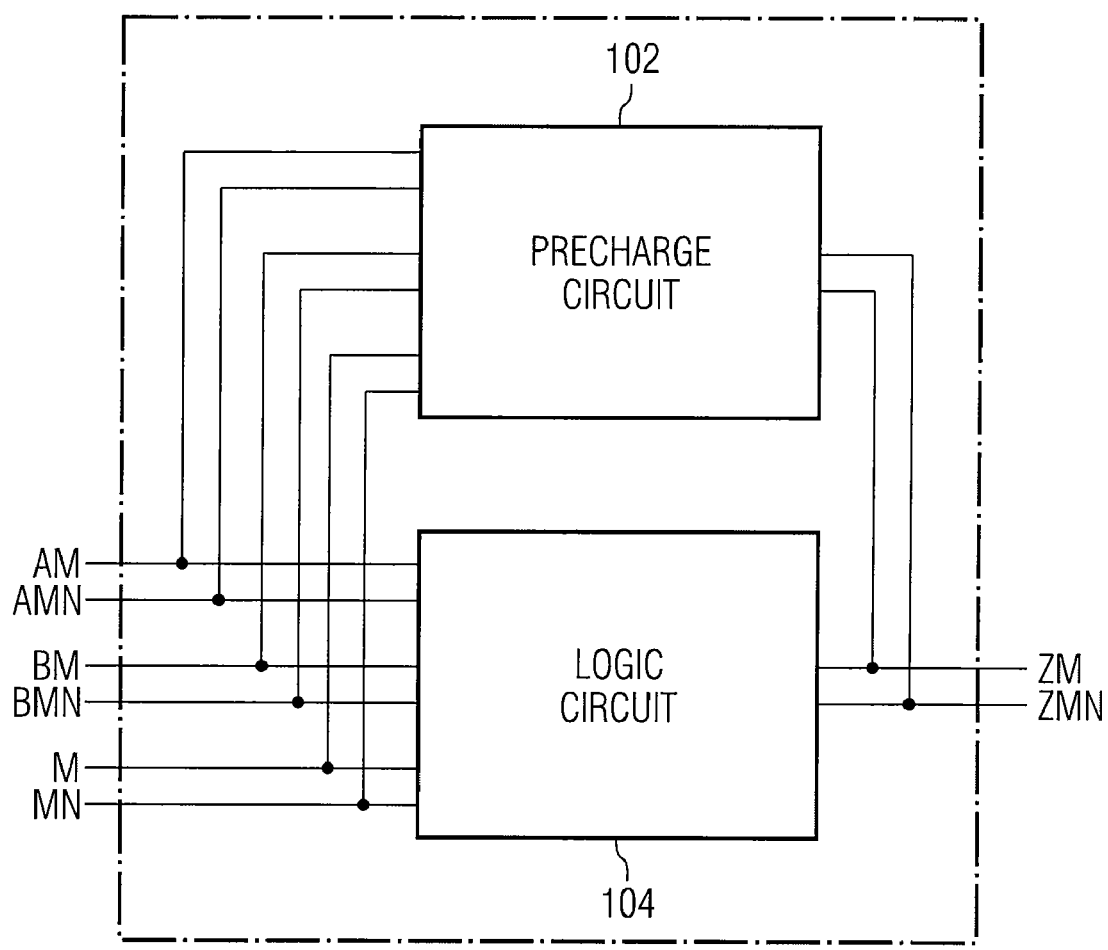
FIG. 1 is a schematic illustration of a circuit according to an embodiment of the present invention.

In the subsequent description of the preferred embodiments of the present invention, the same or similar reference numerals are used for the similarly acting elements illustrated in the various drawings, wherein repeated description of these elements is omitted.

FIG. 1 shows a circuit for calculating a logic combination of two encrypted input operands according to an embodiment of the present invention. The circuit is embodied in dual-rail circuit technology. Here, each bit transmitted on a dual-rail line is represented by two nodes, wherein each bit has a valid logic value if the first of the two nodes corresponds to the true logic value of this bit, and the second one of the two nodes to the value inverted thereto. Such valid logic values are referred to as data values in the following. A so-called precharge state, also called "precharge or predischarge", is inserted between two data values with valid logic values 1,0 or 0,1. In such a pre-charge state, both nodes of the dual-rail line are charged to the same electrical potential and take on logically invalid values 1,1 or 0,0. Such logically invalid values will be referred to as precharge values in the following. In the following embodiments, the states 0,0 are assumed as precharge values. In this case, the states 1, 1 are not allowed. Alternatively, the states 1,1 may also be assumed as precharge values. In this case, the states 0,0 are not allowed. Calculation cycles, in which valid data values are present at the circuit, alternate with precharge cycles, in which invalid logic values in form of precharge values are present at the circuit. If precharge values are present at an input of the circuit, these are gated to the output of the circuit, without an additional clock signal or precharge signal being required for this. According to the present invention, precharge values are output at the output of the circuit as soon as precharge values are present at least at one input of the circuit. This corresponds to the transition from a calculation cycle, in which valid data values are present at the input of the circuit, to the precharge cycle, in which precharge values are present at the input of the circuit. At the transition from the pre-charge cycle to the calculation cycle, precharge values are output at the output of the circuit until no precharge values are present anymore at any inputs of the circuit.

The circuit shown in FIG. 1 is based on the masked dual-rail precharge logic and works with masked input signals as well as a masked output signal. To this end, the circuit receives a mask with which both the input signals and the output signal to be output are masked.

The circuit shown in FIG. 1 comprises a precharge circuit 102 and a logic circuit 104. The circuit comprises a first input for receiving a first dual-rail signal AM, AMN and a second input for receiving the dual-rail signal BM, BMN. Furthermore, the circuit comprises a third input for receiving a dual-rail encryption signal M, MN. The dual-rail signals AM, AMN, BM, BMN comprise data values in the calculation cycle, and precharge values in the precharge cycle. This means that in the calculation cycle, for example, a 0 is present on the signal AM and a 1 on the signal AMN, or a 1 is present on the signal AM and a 0 on the signal AMN. In the precharge cycle, a 0 or a 1 is each present on the signals AM, AMN. The encryption signal comprises encryption values in the calculation cycle, and precharge values in the precharge cycle. The circuit further comprises an output for outputting a dual-rail signal ZM, ZMN. The dual-rail output signal, just like the dual-rail input signals, comprises data values in the calculation cycle and precharge values in the precharge cycle. The encryption signal M, MN contains the mask with which the input signals AM, AMN and BM, BMN are encrypted and with which the output signal ZM, ZMN is encrypted. The dual-rail signals AM, AMN, BM, BMN, M, MN are supplied to both the precharge circuit 102 and the logic circuit 104.

The logic circuit 104 is formed to perform a logic combination of the values present on the dual-rail signals AM, AMN, BM, BMN. Here, the encryption values present on the encryption signal M, MN are taken into account. The logic combination is done in one pass, i.e. the input signals AM, AMN, BM, BMN are not encrypted first and then logically combined, but the logic combination is done at once based on the encrypted input signals AM, AMN, BM, BMN, taking the mask M, MN into account. Likewise, an encryption of the output signal ZM, ZMN is not done in a downstream encryption step, but is done directly during the logic combination of the encrypted input signals AM, AMN, BM, BMN, taking the mask M, MN into account. The result of the logic combination is laid on the output of the circuit by the logic circuit 104 and is output by the dual-rail output signal ZM, ZMN in the calculation cycle.

The precharge circuit 102 is formed to ensure that the calculation cycle of the dual-rail output signal ZM, ZMN, in which the result values of the logic circuit 104 are output, begins only when none of the input signals AM, AMN, BM, BMN, M, MN has precharge values anymore, or when all of the input signals AM, AMN, BM, BMN, M, MN have valid data values or encryption values. As long as precharge values are still present on one of the input signals AM, AMN, BM, BMN, M, MN and sensed at the input of the circuit, the precharge circuit 102 impresses precharge values on the output signal ZM, ZMN.

Figure 2:
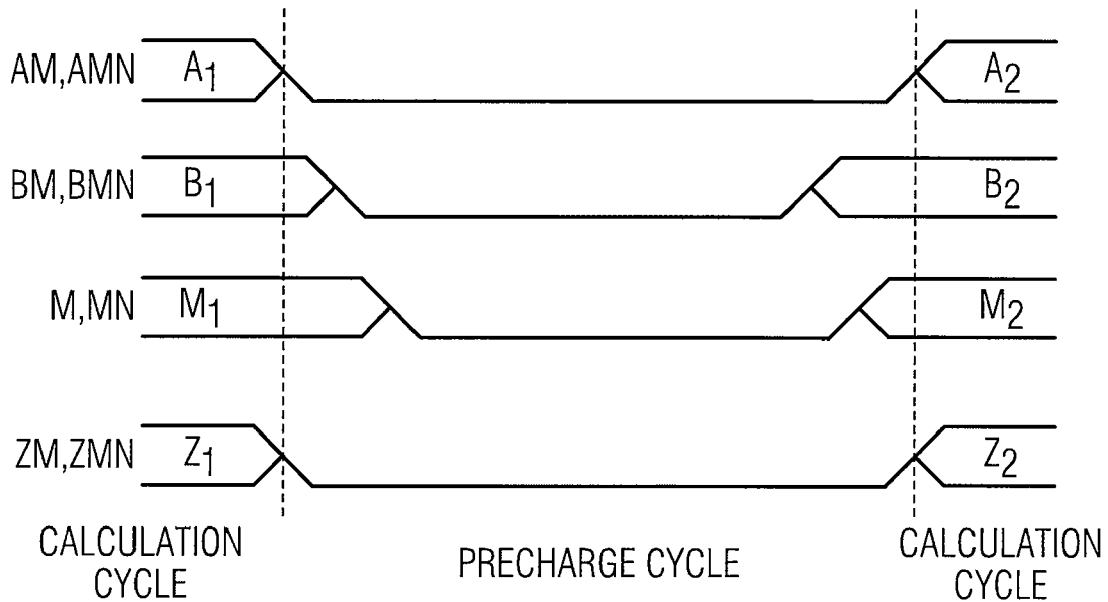
FIG. 2 is a time illustration of calculation cycles and precharge cycles according to an embodiment of the present invention.

FIG. 2 illustrates a transition from the calculation cycle to the precharge cycle and from the precharge cycle to a further calculation cycle. In the calculation cycle, valid values designated by $A_1$, $B_1$, $M_1$ and $Z_1$ in FIG. 2 are present at the input signals AM/AMN, BM/BMN, M/MN as well as at the output signal ZM/ZMN. The signals AM, BM, M, ZM have a logic state of 0 or 1, and the accompanying dual-rail signals AMN, BMN, MN, ZMN have the logic state inverted thereto. At the transition from the calculation cycle to the precharge cycle, all signals AM, AMN, BM, BMN, ZM, ZMN assume the same logic value, here logic 0.

By the inventive approach, it is ensured that the output signal ZM, ZMN has a precharge value, here logic 0, as soon as the first input signal, in this case the input signal AM, AMN, assumes the precharge value. This is guaranteed by the precharge circuit 102 shown in FIG. 1. Without this precharge circuit 102, data values could still be present at the output ZM, ZMN as long as the second input signal BM, BMN or the encryption signal M, MN has valid data values. Furthermore, undefined states and spurious impulses could arise in this time interval without the precharge circuit 102. The precharge circuit 102 prevents such undefined states on the output signal ZM, ZMN, which could lead to spurious impulses or a multiple switching of the output signal ZM, ZMN. At the transition from the precharge cycle to the calculation cycle, the precharge circuit 102 also ensures that the output signal ZM, ZMN has precharge values as long as precharge values are still present on at least one of the input signals. In this case, this means that the output signal ZM, ZMN only assumes valid data values when the input signals AM, AMN, BM, BMN and the encryption signal M, MN have assumed valid data values. The precharge circuit 102 thus prevents the output from changing in advance on the arrival of individual input values, even if the logic function would allow this. The output change is carried out only when all input values have transitioned from the precharge state to the assessed state.

Figure 3:
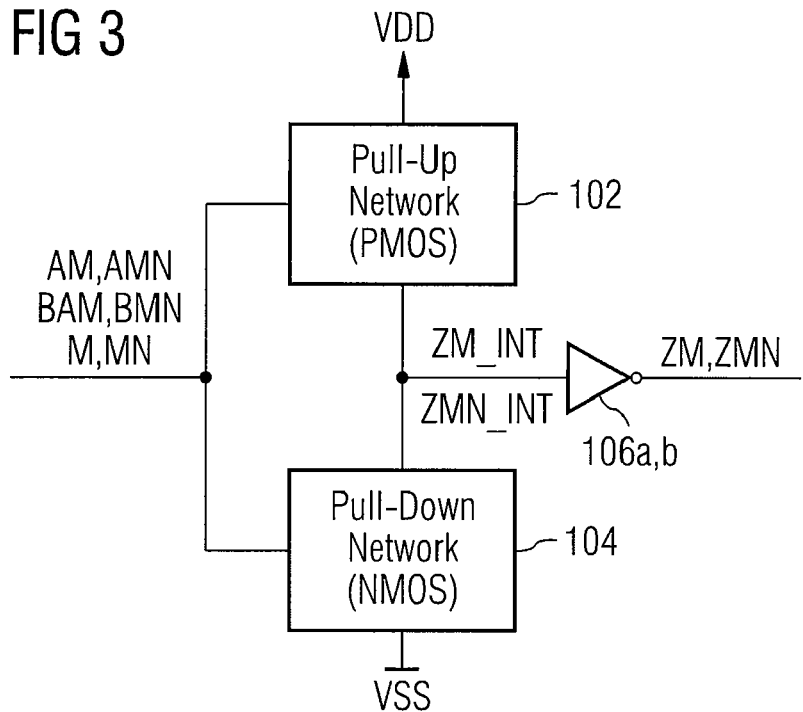
FIG. 3 is a schematic illustration of a circuit according to a further embodiment of the present invention.

FIG. 3 shows a further block circuit diagram of a circuit for calculating a logic combination of two encrypted input operands according to the present invention. The inventive circuit again comprises a precharge circuit 102 and a logic circuit 104, which are both formed to receive the masked dual-rail signal AM, AMN and BM, BMN, as well as the dual-rail encryption signal M, MN. The precharge circuit 102, as well as the logic circuit 104, are connected to a dual-rail intermediate node ZM_INT, ZMN_INT on the output side. Furthermore, the circuit comprises an inverter pair 106a, 106b connected between the output of the circuit and the intermediate node. The first inverter 106a is formed to invert a logic state of the first node ZMN_INT of the intermediate node and output ZMN as output signal at the output of the circuit. The second inverter 106b is formed to invert a logic state of the second node ZM_INT of the intermediate node and output ZM as output signal at the output of the circuit. The output signals not yet inverted at the intermediate node ZM_INT, ZMN_INT are already encrypted with the mask M, MN.

In this embodiment, a logically first state 1 is physically realized by a high voltage potential VDD and a second logic state 0 by a low voltage potential VSS.

The precharge circuit 102 is realized as a pull-up network impressing the high voltage potential VDD on the intermediate node ZM_INT, ZMN_INT, depending on the input signals AM, AMN, BM, BMN, M, MN. To this end, the precharge circuit 102 is connected to a first, high potential terminal VDD.

In this embodiment, the logic circuit 104 is realized as a pull-down network formed to draw the intermediate node ZM_INT, ZMN_INT to the low electrical potential, depending on the input signals AM, AMN, BM, BMN, M, MN. To this end, the logic circuit 104 is connected to a second, low potential terminal, in this case a ground terminal VSS.

The logic circuit 104 may, for example, be a logic circuit performing a logic XOR combination of the encrypted operands transmitted via the input signal AM, AMN, BM, BMN.

Figures 14, 15A, 15B:
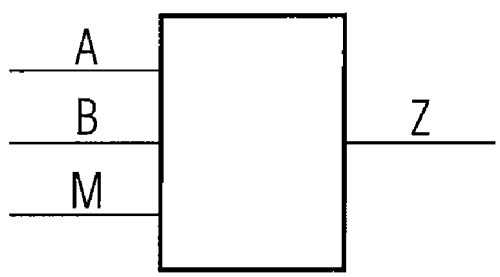
FIG. 14 is a block circuit diagram of a logic cell used for masking according to the prior art.
FIGS. 15a-b are tables of values according to the prior art.

FIG. 4 shows a table of values underlying such an XOR combination. According to the inventive approach, the table of values shown in FIG. 15c is extended in the first three rows. Accordingly, the output signals ZM, ZMN are in the precharge state or idle state when precharge values are present on at least one of the input signals AM, AMN, BM, BMN, M, MN. Thus, it is sufficient for a logic 0 to be present at the input signals AM, AMN each, in order to also output a 0 on the output signal ZM, ZMN. The logic state of the signals BM, BMN, M, MN is not considered here. In the table of values, this is designated by don't care (-) being entered for the signals BM, BMN, M, MN. Don't care stands for a logic 0 or logic 1, wherein the combination logic 1, logic 1 is forbidden for an input pair. Correspondingly, precharge values are already output at the output ZM, ZMN when the second input signal BM, BMN is in the precharge state, independently of whether data values or precharge values are present at the first input signal AM, AMN, or whether encryption values or precharge values are present at the encryption signal M, MN. The same applies for the encryption signal M, MN. If precharge values are present on the encryption signal M, MN, precharge values are output at the output signal ZM, ZM_N, independently of whether data values or precharge values are present at the input signals AM, AM_N and BM, BM_N.

By a specialization of the output values on 0/0 instead of dc/dc in idle inputs, i.e. in input signals having precharge values, the inventive circuit does indeed become larger, but the switching time instant is always the same independently of the input data.

The gates may be implemented so that the pull-up network only codes the precharge state and thus is independent of the function to be implemented. The cells may therefore be used again half.

In addition, the "don't cares" on the input side of the table of values lead to unification of the pull-up network, i.e. that for all logic functions the pull-up network is the same and may therefore be used again.

The pull-down network, however, has to be extended as far as only one path is activated throughout at the most. With this, floating states and shorts are avoided.

The inventive approach has been explained here by way of example at a table of values for an XOR2 function. Corresponding tables of values may also be set up for other logic functions.

Figure 5:
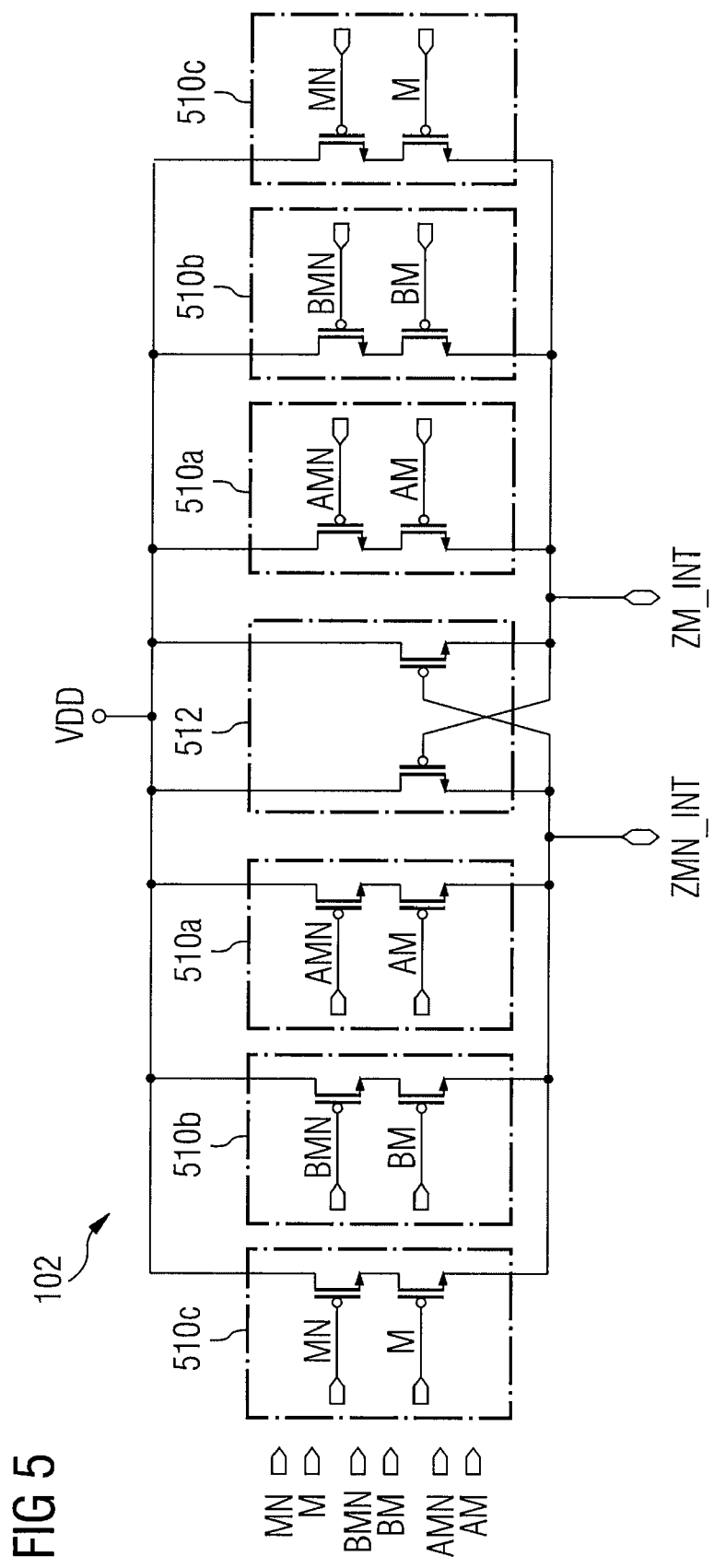
FIGS. 5 and 6 are circuit diagrams of precharge circuits according to embodiments of the present invention.

FIG. 5 shows a more detailed circuit diagram of a precharge circuit 102, as it may for example be used for the embodiment described on the basis of FIG. 3. The precharge circuit 102 is a transistor circuit realizing a pull-up network. Depending on the dual-rail input signals AM, AMN, BM, BMN, M, MN, the precharge circuit draws the nodes of the dual-rail intermediate node ZM_INT, ZMN_INT to the high voltage potential VDD. If precharge values, i.e. in this case a low voltage potential, are present at one of the input signals AM, AMN or BM, BMN or M, MN, for example on the signal AM and the signal AMN, the precharge circuit 102 gates the high voltage potential through to both nodes of the intermediate nodes ZM_INT, ZMN_INT from the potential terminal VDD. To this end, the precharge circuit 102 comprises comparison means 510a, 510b, 510c formed to gate the high voltage potential VDD through to the intermediate nodes ZM_INT, ZMN_INT, when precharge values are present at one of the dual-rail input signals AM, AMN, BM, BMN, M, MN. A comparison means, for example the comparison means 510a, according to this embodiment, comprises two transistors connected in series. The source terminal of the first transistor is connected to the high voltage potential VDD, and the drain terminal of the second transistor is connected to the intermediate node ZM_INT and/or ZMN_INT. The gate terminal of the first transistor is controlled by the signal AMN of the first dual-rail input signal AM, AMN, and the gate terminal of the second transistor by the signal AM of the dual-rail input signal AM, AMN. The transistors are p-type transistors. Thus, both transistors gate, when the low voltage potential is present at both gate terminals. If a high voltage potential is present at one of the gate terminals, as this is the case when a valid data value is present on the input signal AM, AMN, the comparison means 510a blocks. The second comparison means 510b is connected in parallel to the first comparison means 510a and is controlled by the second dual-rail input signal BM, BMN. Correspondingly, the third comparison means 510c is connected in parallel to the first and second comparison means 510a, b and is controlled by the dual-rail encryption signal M, MN. The comparison means 510a, 510b, 510c are each embodied twice, in order to control both intermediate nodes ZM_INT, ZMN_INT.

If a valid data value or encryption value is present at the input signals AM, AMN, BM, BMN, and the encryption signal M, MN, the comparison means 510a, 510b, 510c block. In order to apply a valid data value to the intermediate node ZM_INT, ZMN_INT, it is, however, required that a node of the intermediate node ZM_INT, ZMN_INT be connected to the high voltage potential VDD. To this end, the precharge circuit 102 comprises a hold element 512 consisting of two transistors connected to the high voltage potential VDD at their source inputs and to the node ZMN_INT and/or the node ZM_INT of the intermediate node at their drain outputs. The gate terminals are each controlled by the other node of the intermediate node ZMN_INT, ZM_INT than the node to which the drain terminal of the respective transistor is connected. The transistors also are p-type transistors. The hold element 512 guarantees that one of the nodes of the intermediate node ZM_INT, ZMN_INT is held at the high voltage potential VDD as soon as the other node is drawn to a low voltage potential VSS by the logic circuit 104.

Figure 6:
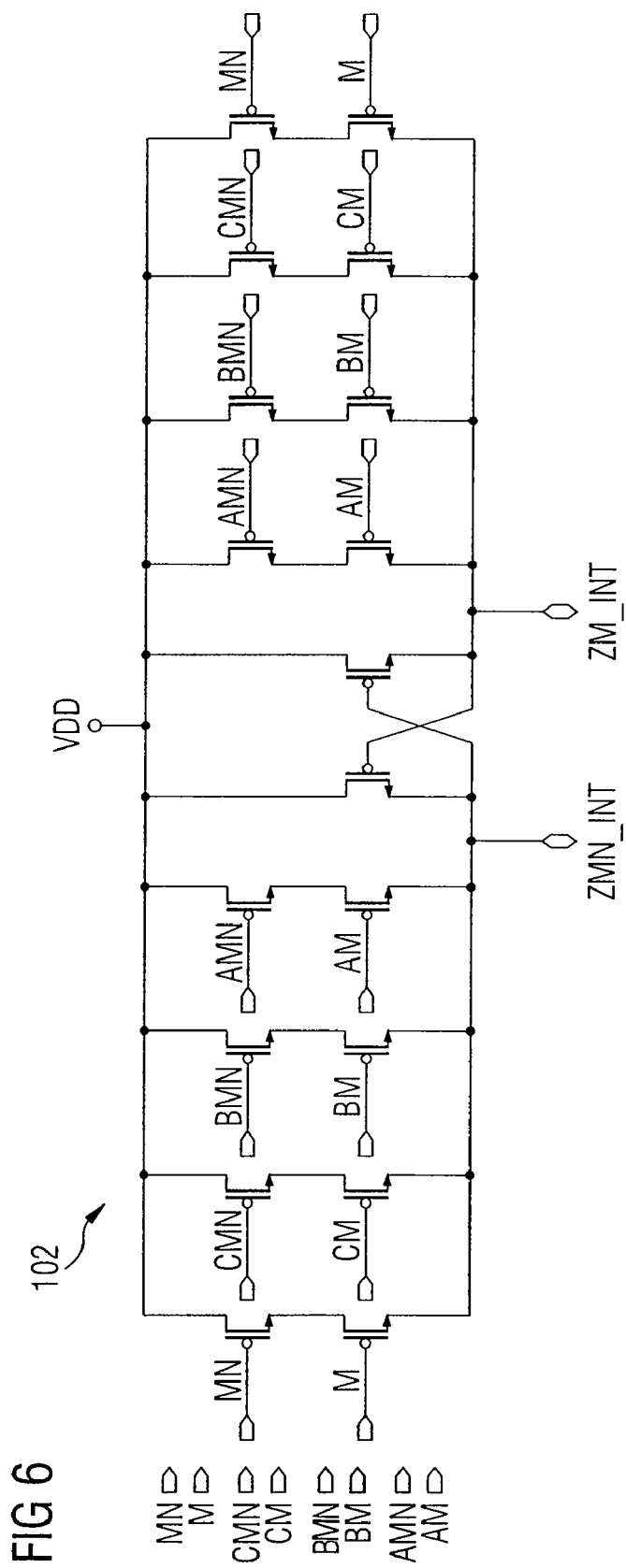

FIG. 6 shows a further precharge circuit 102 for an inventive circuit with three inputs for the signals AM, AMN, BM, BMN, CM, CMN, and an encryption input for the signal M, MN. Different from the precharge circuit shown in FIG. 5, the precharge circuit 102 shown in FIG. 6 comprises a further comparison means each, which ensures that the intermediate node ZM_INT, ZMN_INT is connected to the high voltage potential VDD as soon as precharge values are present at the third input signal CM, CMN.

Figure 7:
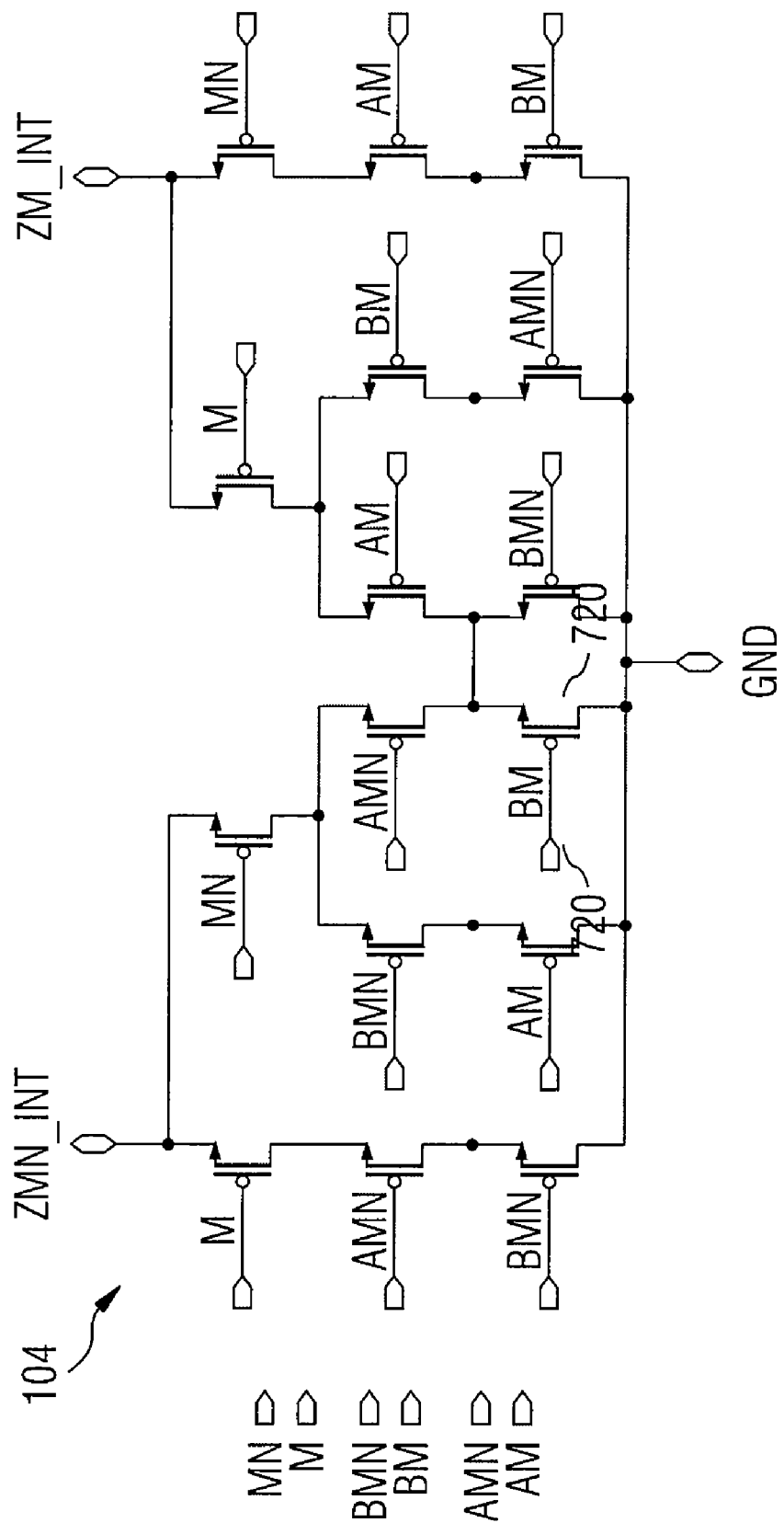
FIGS. 7 to 13 are circuit diagrams of logic circuits according to embodiments of the present invention.
Figure 8:
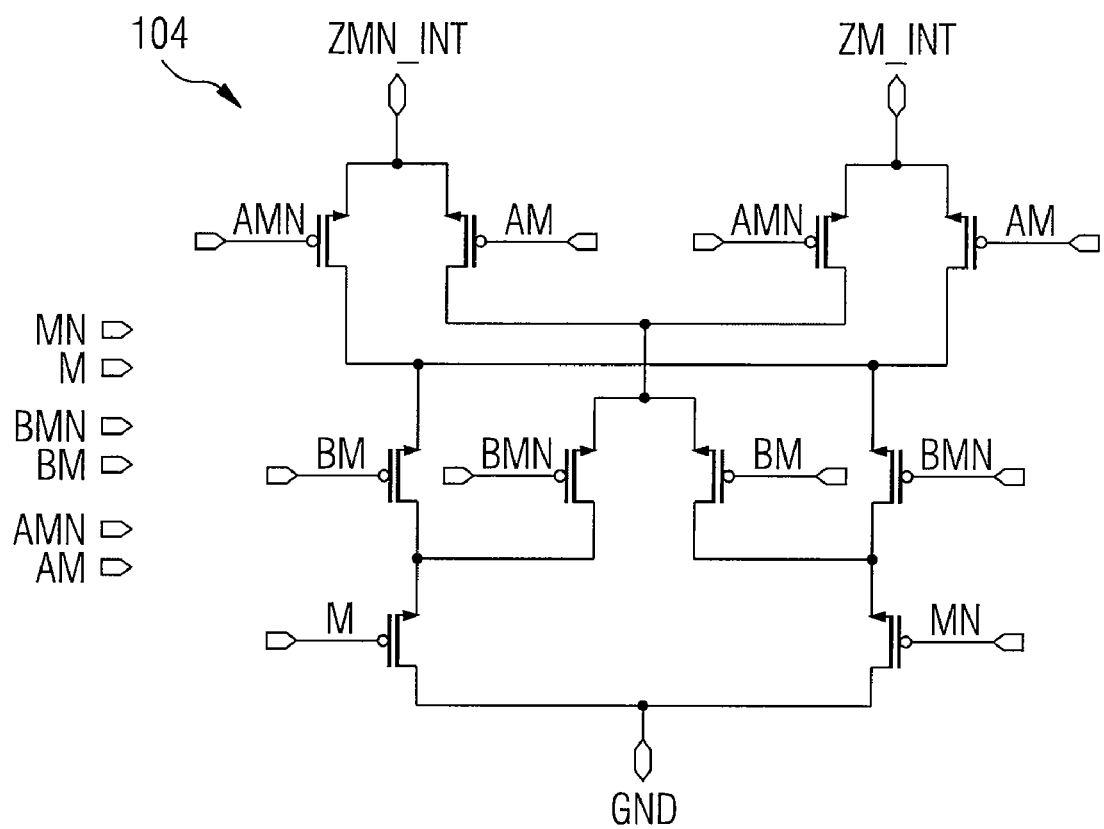

FIGS. 7 to 13 show embodiments of logic circuits 104, as may be employed for the embodiment described in FIG. 3. Here, the logic circuits described in FIGS. 7 and 8 are formed for the combination of two encrypted input signals, taking the encryption signal into account, and the logic circuits 104 shown in FIGS. 9 to 13 for the combination of three input signals, taking the encryption signal into account. Accordingly, the logic circuits 104 shown in FIGS. 7 and 8 may be employed together with the precharge circuit 102 shown in FIG. 5, and the logic circuits 104 shown in FIGS. 9 to 13 with the precharge circuit shown in FIG. 6. The logic circuits 104 shown in FIGS. 7 to 13 are realized as transistor circuits, which realize a pull-down network. N-type transistors have been employed. The logic circuits 104 are connected between a second potential terminal with a ground potential GND or VSS and the intermediate node ZM_INT, ZMN_INT. The gate terminal of the logic circuits 104 shown in FIGS. 5-13, as well as the transistors employed in the precharge circuits 102, are controlled by the input signals AM, AMN, BM, BMN and/or the further input signals in circuits for three or more input signals, taking the encryption signal M, MN into account. According to the embodiments shown in FIGS. 5-13, the precharge circuits 102 and the logic circuits 104 are embodied as stand-alone circuits having no common transistors.

The logic circuits 104 shown in FIGS. 7 to 13 are formed to break a connection between the low potential terminal GND and the intermediate nodes ZM_INT, ZMN_INT as soon as precharge values are present on at least one of the input signals AM, AMN, BM, BMN, M, MN. But if valid data values are present at all input signals AM, AMN, BM, BMN, M, MN, the logic circuits 104 shown are formed to connect one of the nodes of the intermediate node ZM_INT, ZMN_INT to the low voltage potential GND, corresponding to the logic combination to be realized, and thus output a valid data value.

FIG. 7 shows a logic circuit 104 in form of a transistor circuit for realizing an AND combination. The transistor circuit 104 comprises discharge transistors 720 used for both discharging the node ZM_INT and discharging the node ZMN_INT. The drain terminals of the two transistors 720 are connected. Such common transistors 720 are also employed in the further embodiments of FIGS. 8 to 13 to reduce the required number of transistors.

For realizing the AND combination, three transistors, the gates of which are controlled by the signals M, AMN, and BMN, are connected in series between the node ZMN_INT and the potential terminal GND. A further transistor circuit with a first transistor, the drain terminal of which is connected to the node ZMN_INT and the gate terminal of which to the signal MN, is arranged in parallel thereto. The source terminal of this transistor is connected to the ground potential GND via a first or a second transistor series connection. The first series connection consists of two transistors, the gate terminals of which are connected to the signal AM and BMN, respectively. The second series connection consists of two transistors, the gate terminals of which are connected to the signal AMN and the signal BM, respectively. The drain terminals of the two transistors 720 are connected. The transistor circuit connected to the node ZMN_INT corresponds to the transistor circuit connected to the node ZM_INT, with the difference that the gate terminals of the respective transistors are connected to the respective inverted signal of the dual-rail signals.

FIG. 8 shows a logic circuit 104 according to a further embodiment, which realizes a logic XOR combination of two input signals AM, AMN, BM, BMN, taking the encryption signal M, MN into account.

The intermediate node ZMN_INT is connected to the ground potential GND via a series connection of three transistors, the gate terminals of which are controlled with the signal M, BM, AMN. The drain terminal of the transistor controlled by the signal M is connected to the source terminal of a further transistor, which is controlled by the signal BMN, the drain terminal of which is in turn connected to the source terminal of a transistor controlled by the signal AM, wherein the drain terminal thereof is connected to the node ZMN_INT. A corresponding circuit is arranged between the node ZM_INT and the ground potential GND, wherein the transistors corresponding to each other are in turn controlled by the respective inverted signals. Furthermore, there is a connection between the source terminals of the transistors corresponding to each other, which are directly connected to the intermediate nodes ZM_INT, ZMN_INT.

Figure 9:
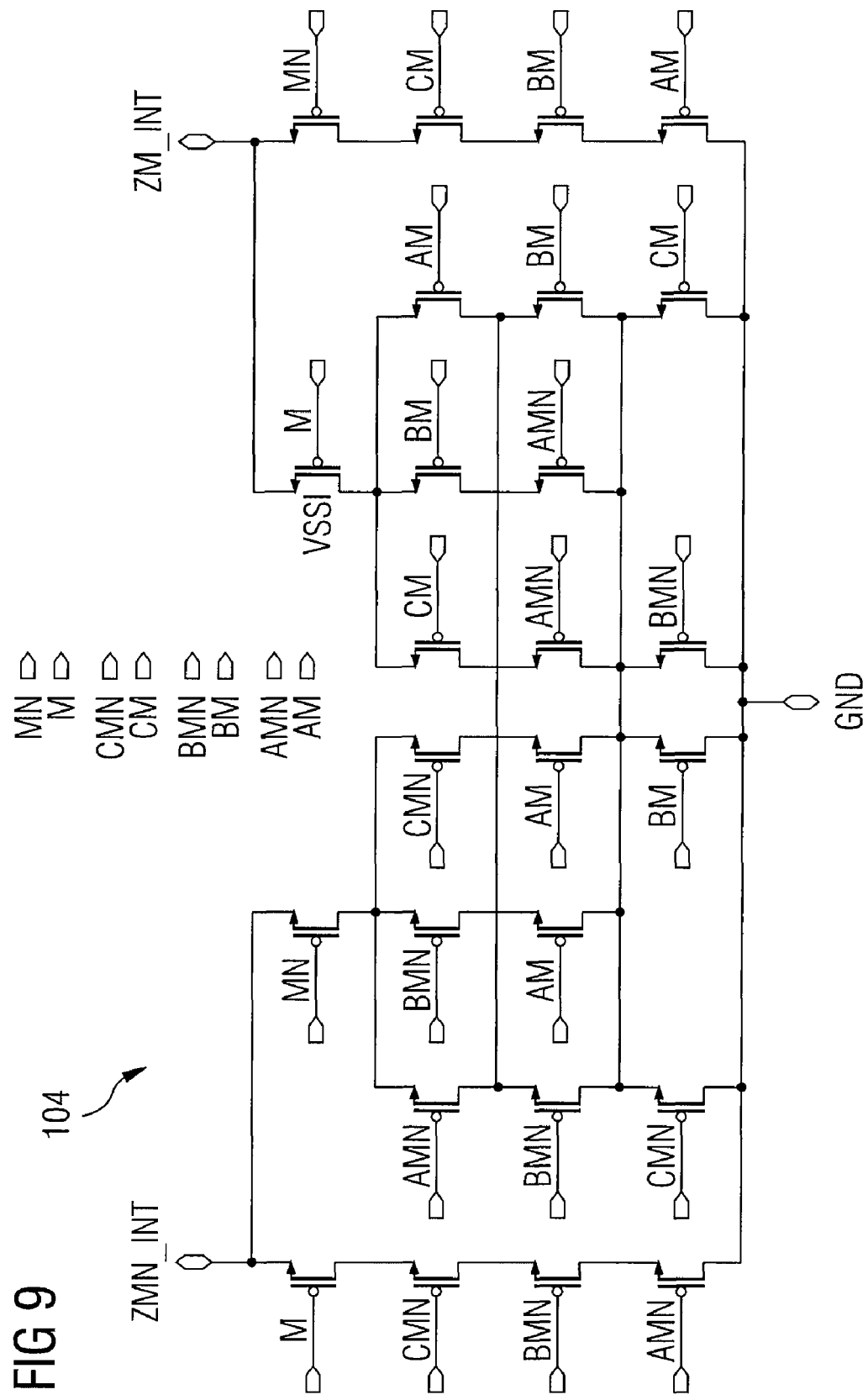

FIG. 9 shows a further embodiment of a logic circuit 104, which is formed to carry out an AND combination among three input signals AM, AMN, BM, BMN, CM, CMN, taking the encryption signal M, MN into account.

Figure 10:
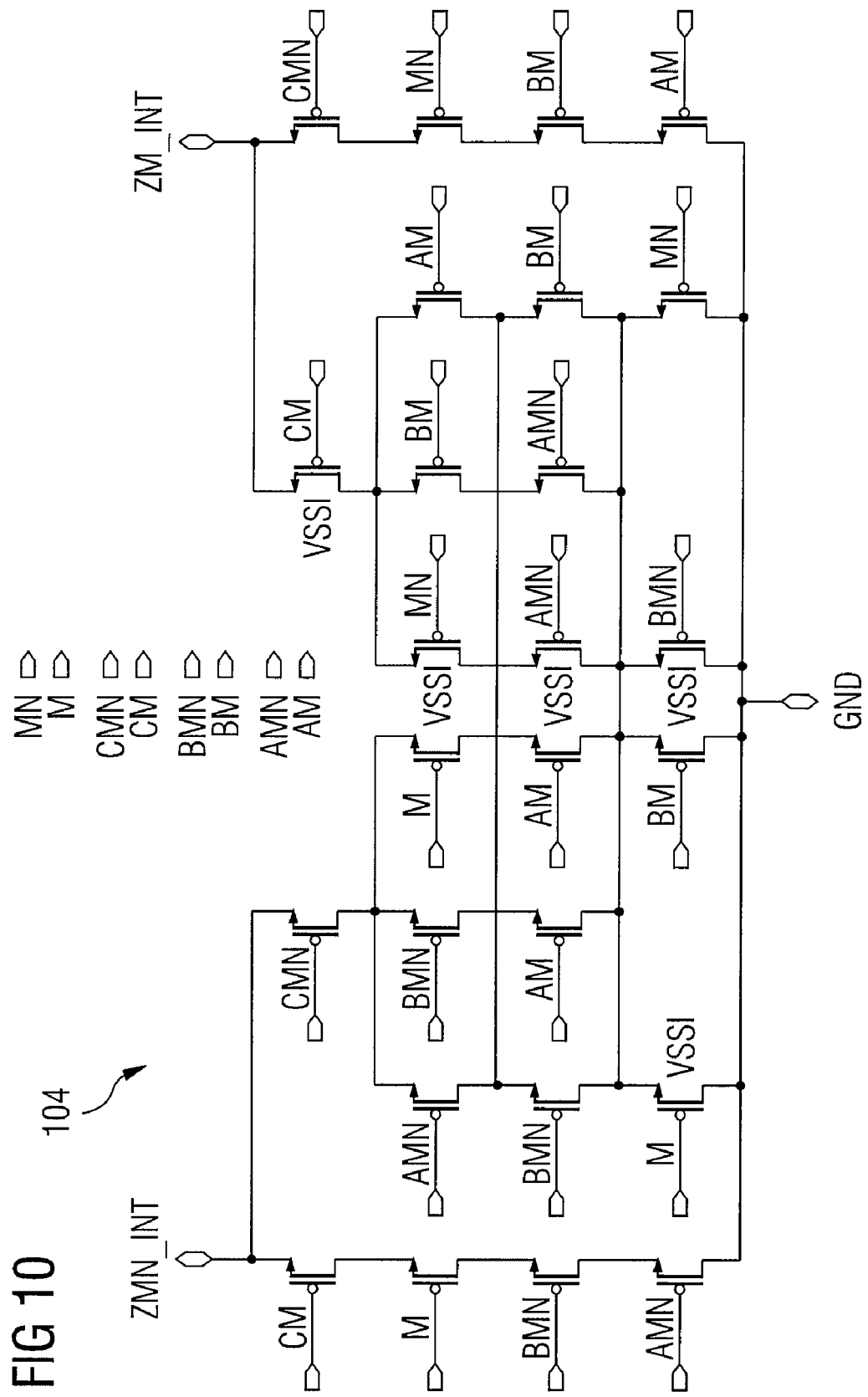

FIG. 10 shows a logic circuit 104 of a further embodiment, carrying out a logic AND-OR combination among three input signals AM, AMN, BM, BMN, CM, CMN, taking the encryption signal M, MN into account.

Figure 11:
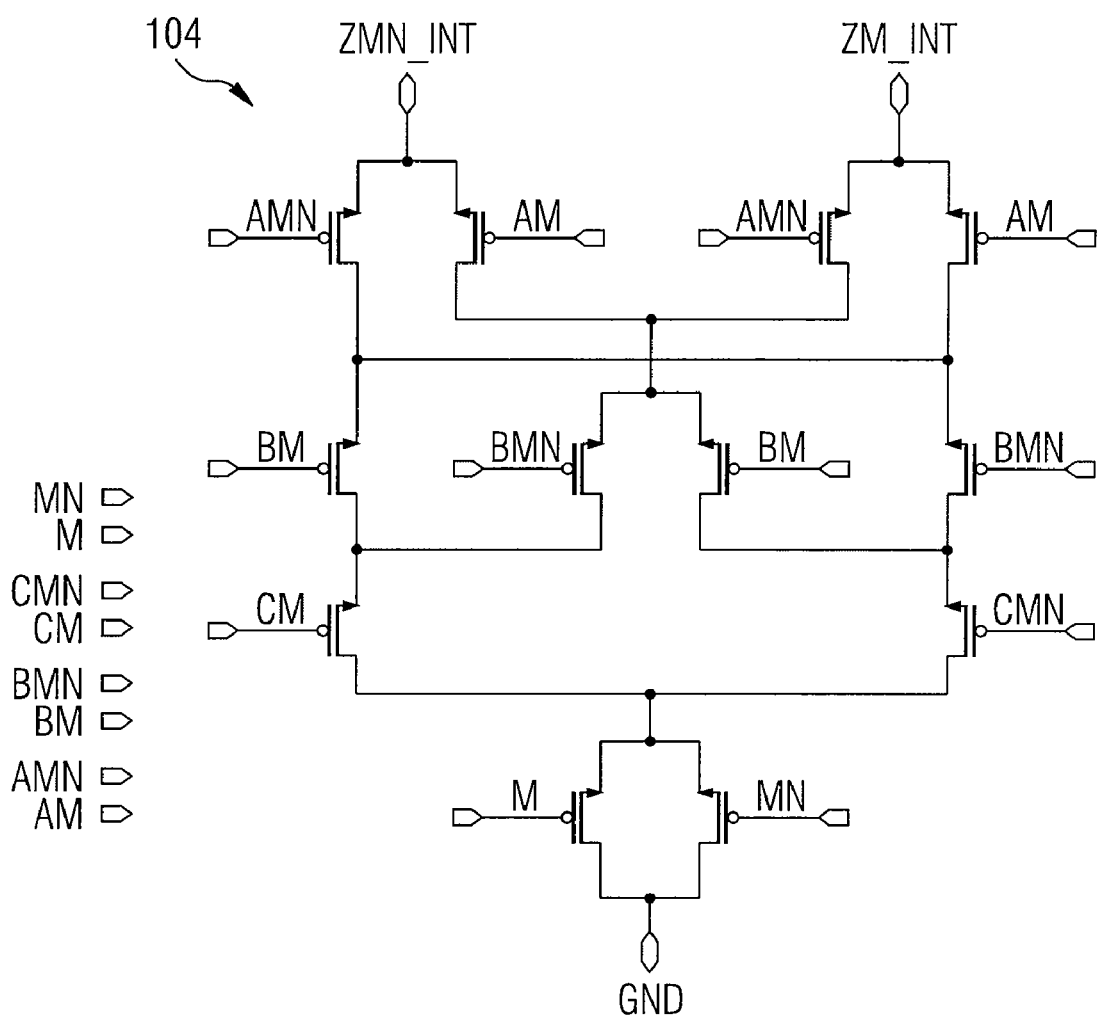

FIG. 11 shows a further embodiment of a logic circuit 104, which is formed to carry out a logic XOR combination among three input signals AM, AMN, BM, BMN, CM, CMN, taking the encryption signal M, MN into account.

Figure 12:
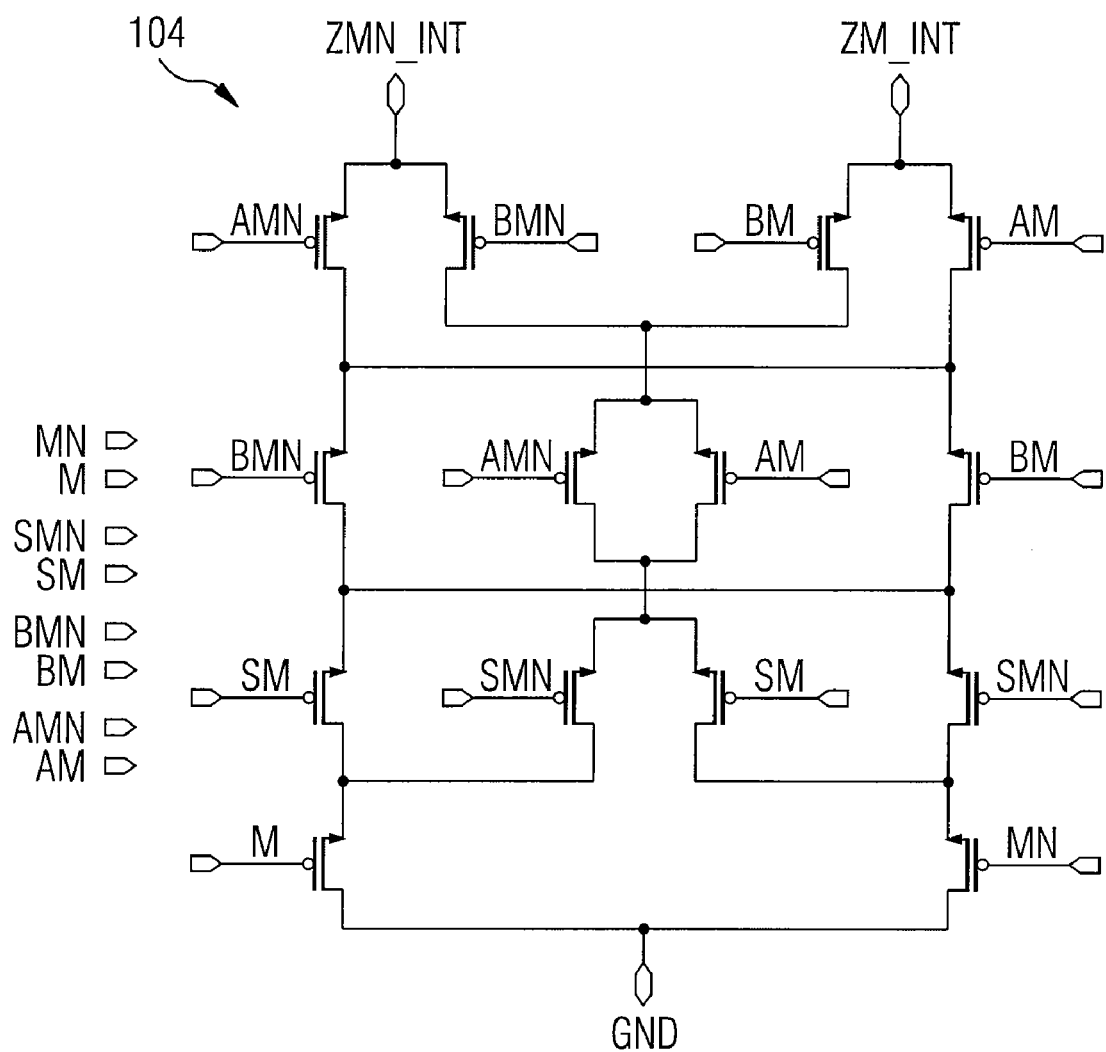

FIG. 12 shows a further embodiment of a logic circuit 104, which is formed to carry out a multiplexer combination among two input signals AM, AMN, BM, BMN, and a select signal SEL, SELN, taking the encryption signal M, MN into a c-count.

Figure 13:
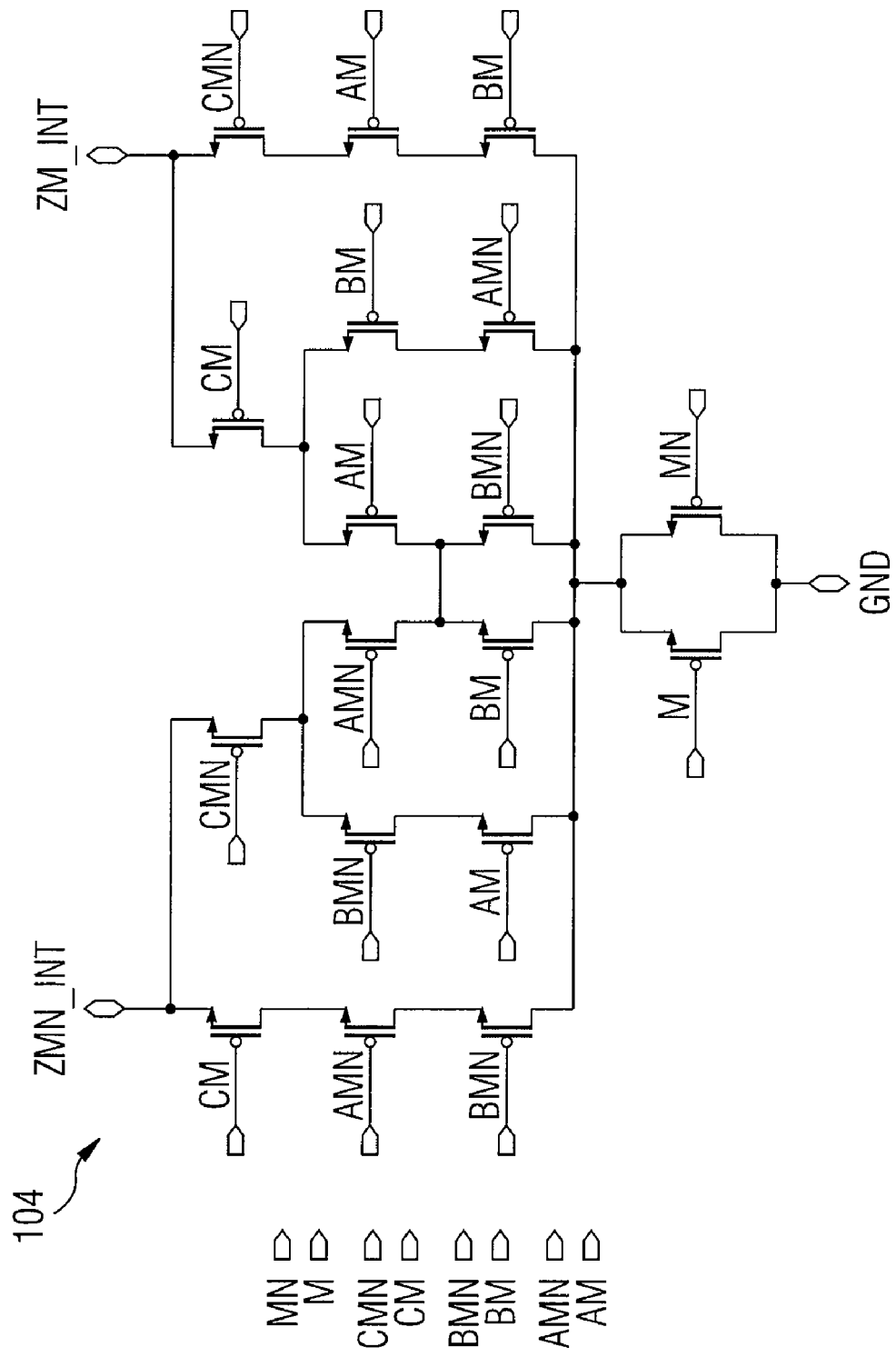

FIG. 13 shows a further embodiment of a logic combination 104, which is formed to carry out a majority combination among three input signals AM, AMN, BM, BMN, CM, CMN, taking the encryption signal M, MN into account.

The exact connection of the transistors used in FIGS. 5 to 13 can be seen from the corresponding figures.

The circuits 102, 104 shown in FIGS. 5 to 13 may be used for the inventive circuit, as it is illustrated as a block circuit diagram in FIG. 3. To this end, the inverters shown in FIG. 3 are used to invert a logic state of the intermediate nodes ZM_INT, ZMN_INT, and output the same at the output as result signal ZM, ZMN.

All gates in a library based on this embodiment have the same structure, which can be divided into three groups. A pull-down network 104 implements the logic functionality. A pull-up network 102 implements the precharge functionality, i.e. precharging the output signals. The pull-up network is constructed in the same manner with the equal number of inputs for all gates. The two output inverters form the third group.

By the pull-up network, the precharge state is always defined as long as at least one input is in the precharge state.

In the evaluation case, i.e. the calculation cycle, only either the ZMN_INT node or the ZM_INT node is discharged by the pull-down network. The pull-down networks are designed so that no more than only one path is gated to the low voltage potential, i.e. to VSS, since different discharge currents would otherwise flow at different input combinations.

The networks for discharging the nodes ZMN_INT and/or ZM_INT may utilize, function permitting, partially the same transistors, for example, in the pull-down network 104 shown in FIG. 8 for implementing an XOR functionality, the two transistors the source terminal of which is connected to the ground potential.

By the fact that differential values 1/0 or 0/1 are always assumed in the evaluation state in the dual-rail technologies, a logic inversion of the gate may be achieved by exchanging the two output lines ZM, ZMN. Furthermore, if even the input pairs AM, AMN and BM, BMN are exchanged, all possible logic functions with two inputs can be mapped with two different pull-down networks. For mapping all logic functions with three inputs, only five structures are required.

In addition, the mask dual-rail input is required every time. Thus, the corresponding pull-up networks are each supplemented by an additional P path, the gates of which are connected to the signals "M" and "MN".

Functions with several inputs can be realized correspondingly.

The transistor circuits shown in FIGS. 5-13 are exemplary and may be replaced by circuits with equal functionality. The inventive approach may be expanded to circuits with four or more inputs for receiving further dual-rail signals. Likewise, the present invention is not limited to the transistor logic shown. The logic combinations may for example be an AND, NAND, OR, NOR, XOR, NXOR, ANDOR, ORAND, multiplexer, or majority function. The encryption rule may be an XOR combination or an NXOR combination.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A circuit for calculating a logic combination of two encrypted input operands, comprising:

a first input configured to receive a first dual-rail signal comprising data values of the first input in a calculation cycle and precharge values in a precharge cycle;

a second input configured to receive a second dual-rail signal comprising data values of the second input in the calculation cycle and precharge values in the precharge cycle;

a third input configured to receive a dual-rail encryption signal comprising encryption values in the calculation cycle and precharge values in the precharge cycle;

an output configured to output a dual-rail result signal comprising encrypted result values in the calculation cycle and precharge values in the precharge cycle;

wherein the data values of the first and second dual-rail signals and the encrypted result values of the dual-rail result signal are encrypted with the encryption values of the dual-rail encryption signal according to an encryption rule;

a logic circuit configured to determine the encrypted result values according to the logic combination from the data values of the first input and of the second input and the encryption values, and to output the encrypted result values at the output in the calculation cycle; and a precharge circuit configured to already impress precharge values in the output, when precharge values are sensed at a single input, or formed to start impressing the precharge values only when the first dual-rail signal and the second dual-rail signal comprise data values and the dual-rail encryption signal comprises encryption values.

2. The circuit of claim 1, wherein each dual-rail signal consists of a first signal and a second signal each, and wherein the first and the second signal of the dual-rail signals have equal logic states each at precharge values and logic states inverted to each other at data values, encryption values, and result values.

3. The circuit of claim 1, wherein the precharge values of the dual-rail signals have equal logic states.

4. The circuit of claim 1, wherein the logic combination is an XOR combination according to the table of values

| AM | AMN | BM | BMN | M | NN | ZM | ZMN |
|----|-----|----|----|----|----|----|-----|
| 0  | 0   | —  | —  | —  | —  | 0  | 0   |
| —  | —   | 0  | 0  | —  | —  | 0  | 0   |
| —  | —   | —  | —  | 0  | 0  | 0  | 0   |
| 0  | 1   | 0  | 1  | 0  | 1  | 0  | 1   |
| 0  | 1   | 0  | 1  | 1  | 0  | 1  | 0   |
| 0  | 1   | 1  | 0  | 0  | 1  | 1  | 0   |
| 0  | 1   | 1  | 0  | 1  | 0  | 0  | 1   |
| 1  | 0   | 0  | 1  | 0  | 1  | 1  | 0   |
| 1  | 0   | 0  | 1  | 1  | 0  | 0  | 1   |
| 1  | 0   | 1  | 0  | 0  | 1  | 0  | 1   |
| 1  | 0   | 1  | 0  | 1  | 0  | 1  | 0   | wherein the variable (-) stands for an arbitrary one of the logic states 1 or 0, and wherein AM comprises the data values of the first in-put of the first dual-rail signal, wherein AMN comprises the precharge values of the first dual-rail signal, wherein BM comprises the data values of the second input of the second dual-rail signal, wherein BMN comprises the precharge values of the second dual-rail signal, wherein M comprises the encryption values of the dual-rail encryption signal, wherein MN comprises the precharge values of the dual-rail encryption signal, wherein ZM comprises the encrypted result values of the dual-rail result signal, and wherein ZMN comprises the precharge values of the dual-rail result signal.

5. The circuit of claim 1, further comprising a first potential terminal for a high potential and a second potential terminal for a low potential;

wherein the logic circuit is a pull-down network connected between the second potential terminal and a dual-rail intermediate node, and formed to impress the lower potential on a node of the dual-rail intermediate node when precharge values are sensed neither at the first input nor at the second input nor at the third input configured to receive the dual-rail encryption signal; and wherein the precharge circuit is a pull-up network connected between the first potential terminal and the dual-rail intermediate node, and formed to impress the high potential on both nodes of the dual-rail intermediate node as long as the precharge values are sensed at least at one single input or the third input configured to receive the dual-rail encryption signal; and an inverter pair connected between the dual-rail intermediate node and the output, and formed to supply corresponding logic states of the dual-rail intermediate node corresponding to the high potential or the low potential inverted as dual-rail result signal at the output.

6. The circuit of claim 1, wherein the logic circuit and the precharge circuit are each realized as stand-alone transistor circuits.

7. The circuit of claim 6, wherein the transistor circuit of the logic circuit and the transistor circuit of the precharge circuit have no jointly used transistors.

8. The circuit of claim 6, wherein the logic circuit comprises a discharge transistor formed to impress a low potential on a node of the dual-rail intermediate node in a first calculation cycle and the low potential on another node of the dual-rail intermediate node in a second calculation cycle.

9. The circuit of claim 1, wherein the logic combination is an AND, a NAND, an OR, a NOR, an XOR, a NXOR, an ANDOR, an ORAND, a multiplexer, or a majority function.

10. The circuit of claim 5, wherein the precharge circuit comprises a first comparator, a second comparator, and a third comparator, wherein the first comparator is formed to impress precharge values on the intermediate node when the first signal and the second signal of the first dual-rail signal comprise the same logic values, wherein the second comparator is formed to impress precharge values on the intermediate node when the first signal and the second signal of the second dual-rail signal comprise the same logic values, and wherein the third comparator is formed to impress precharge values on the intermediate node when the first signal and the second signal of the dual-rail encryption signal comprise the same logic values.

11. The circuit of claim 5, wherein the precharge circuit comprises a hold element formed to hold one of the nodes of the dual-rail intermediate node at the high potential when the low potential is impressed on the other node of the dual-rail intermediate node by the logic circuit.

12. The circuit of claim 1, further comprising a further input configured to receive a further dual-rail signal comprising data values of the further input in the calculation cycle and precharge values in the precharge cycle, wherein the data values of the further dual-rail signal are encrypted with the encryption values of the dual-rail encryption signal according to an encryption rule;
wherein the logic circuit is formed to determine the result values according to the logic combination from the data values of the first, second, and further dual-rail signals and the encryption values; and
wherein the precharge circuit is formed to stop impressing the precharge values only when the first, second, and further dual-rail signals comprise data values.

13. The circuit of claim 1, wherein the encryption rule is an XOR combination or an NXOR combination.

14. A method of calculating a logic combination of two input operands, comprising:
receiving, by a first input, a first dual-rail signal at a first input, which comprises data values of the first input in a calculation cycle and precharge values in a precharge cycle;
receiving, by a second input, a second dual-rail signal at a second input, which comprises data values of the second input in the calculation cycle and precharge values in the precharge cycle;
receiving, by a third input, a dual-rail encryption signal comprising encryption values in the calculation cycle and precharge values in the precharge cycle;
determining, by a logic circuit, encrypted result values according to the logic combination from the data values of the first input and of the second input and the encryption values, and outputting the encrypted result values in the calculation cycle at an output configured to output a dual-rail result signal comprising the encrypted result values in the calculation cycle and precharge values in the precharge cycle;
wherein the data values of the first and second dual-rail signals and the result values—are encrypted with the encryption values of the dual-rail encryption signal according to an encryption rule; and
impressing, by a pre-charge circuit, precharge values at the output already when precharge values are sensed at a single input, or stopping impressing the precharge values only when the first and second dual-rail signals comprise data values and the dual-rail encryption signal comprises encryption values,
wherein the method is performed by a hardware circuit comprising the first input, the second input, the third input, the logic circuit, and the precharge circuit.

15. A circuit for calculating a logic combination of two encrypted input operands, comprising:
a first input configured to receive a first dual-rail signal comprising data values of the first input in a calculation cycle and precharge values in a precharge cycle;
a second input configured to receive a second dual-rail signal comprising data values of the second input in the calculation cycle and precharge values in the precharge cycle;
a third input configured to receive a dual-rail encryption signal comprising encryption values in the calculation cycle and precharge values in the precharge cycle;
an output configured to output a dual-rail result signal comprising encrypted result values in the calculation cycle and precharge values in the precharge cycle;
wherein the data values of the first and second dual-rail signals and the encrypted result values of the dual-rail result signal are encrypted with the encryption values of the dual-rail encryption signal according to an encryption rule;
a logic means for determining the encrypted result values according to the logic combination from the data values of the first input and of the second input and the encryption values, and for outputting the encrypted result values at the output in the calculation cycle; and
a precharge means for already impressing precharge values in the output, when pre-charge values are sensed at a single input, or for starting to impress the pre-charge values only when the first dual-rail signal and the second dual-rail signal comprise data values and the dual-rail encryption signal comprises encryption values.

* * * * *